United States Patent [19]

Mishima et al.

[11] Patent Number: 4,637,595
[45] Date of Patent: Jan. 20, 1987

[54] LEAF SPRING ASSEMBLY

[75] Inventors: Yasuhiro Mishima; Katsunori Makibayashi, both of Toyota; Kiyoaki Kuwayama, Nagoya, all of Japan

[73] Assignees: Toyota Jidosha Kabushiki Kaisha; Chuohatsujyo Kabushiki Kaisha, both of Aichi, Japan

[21] Appl. No.: 624,738

[22] Filed: Jun. 26, 1984

[51] Int. Cl.⁴ ............................................. F16F 1/26
[52] U.S. Cl. ...................................... 267/52; 267/149
[58] Field of Search .................. 188/47, 48, 49, 53, 188/52, 148, 149; 280/718, 719, 720, 669

[56] References Cited

U.S. PATENT DOCUMENTS

| 458,705 | 9/1891 | Ludlum | 267/53 |
| 591,812 | 10/1897 | Buckley | 267/52 |
| 1,018,250 | 2/1912 | McIntyre | 267/52 |
| 1,379,798 | 5/1921 | Burgess | 267/52 |
| 1,814,682 | 7/1931 | Frost | 267/52 |
| 3,061,301 | 10/1962 | Bajer et al. | 267/52 |
| 4,508,325 | 4/1985 | Marsh | 267/149 |

FOREIGN PATENT DOCUMENTS

| 0480391 | 1/1952 | Canada | 267/52 |
| 0118338 | 7/1980 | Japan | 267/149 |

Primary Examiner—Duane A. Reger
Assistant Examiner—Alvin Oberley
Attorney, Agent, or Firm—Parkhurst & Oliff

[57] ABSTRACT

A leaf spring assembly comprises a longitudinal leaf spring of fiber reinforced plastics having a first surface to be applied with a tension force and a second surface to be applied with a compression force, a pair of retainer plates attached to the first and second surfaces of the leaf spring, and a pair of U-bolts and nuts for clamping the retainer plates to the leaf spring and mounting the same on an axle housing. The leaf spring is provided at the second surface thereof with a recess which is located substantially at the central portion of the leaf spring. The leaf spring assembly further comprises a seat plate formed with a protruded portion coupled with the recess of the leaf spring and secured to the second surface of the leaf spring, and a position pin fixed to the retainer plate attached to the second surface of the leaf spring, the position pin being coupled with the recess of the leaf spring through the seat plate to position the retainer plates substantially at the central portion of the leaf spring.

3 Claims, 7 Drawing Figures

LEAF SPRING ASSEMBLY

BACKGROUND OF THE INVENTION

The present invention relates to a leaf spring assembly for wheel suspensions, and more particularly to a leaf spring assembly of the type which comprises a longitudinal leaf spring of fiber reinforced plastics, a pair of retainer plates attached to opposite surfaces of the leaf spring, and a pair of fastening U-bolts and nuts for clamping the retainer plates to the leaf spring and mounting the same on an axle housing.

In such a conventional leaf spring assembly as described above, it required a mechanism to facilitate positioning of the leaf spring at its central portion during mounting process of the leaf spring assembly. For such requirement, as is illustrated in FIG. 6, a conventional leaf spring 2 of fiber reinforced plastics is provided substantially at its central portion with a position pin 1 which is inserted into a vertical through hole in leaf spring 2 and fixed in place. In use of the leaf spring 2, there will occur concentration of stress at a portion adjacent the through hole because the reinforcement fibers in leaf spring 2 are disconnected by provision of the vertical through hole for position pin 1. As a result, there occur cracks in the upper surface 2a of leaf spring 2 when repeatedly applied with a tension force. To avoid such a problem, as is illustrated in FIG. 7, a seat plate 4 integral with a position pin 3 has been adhered to the central portion of leaf spring 2. It has, however, been observed that such adhesion of the seat plate 4 results in decrease of its fatigue strength against a load acting thereto in a fore-and-aft direction.

SUMMARY OF THE INVENTION

It is, therefore, a primary object of the present invention to provide an improved leaf spring assembly which is accurately positioned and retained in place without causing the drawbacks described above.

According to the present invention there is provided a leaf spring assembly which comprises a longitudinal leaf spring made of fiber reinforced plastics having a first surface to be applied with a tension force and a second surface to be applied with a compression force, a pair of retainer plates attached to the first and second surfaces of the leaf spring, and means for clamping the retainer plates to the leaf spring and mounting the same on an axle housing, wherein the longitudinal leaf spring is provided at the second surface thereof with a recess which is located substantially at the central portion of the leaf spring, and wherein the leaf spring assembly further comprises a seat plate formed with a protruded portion coupled with the recess of the leaf spring and secured to the second surface of the leaf spring, and a position pin fixed to the retainer plate attached to the second surface of the leaf spring, the position pin being coupled with the recess of the leaf spring through the seat plate to position the retainer plates substantially at the central portion of the leaf spring.

Alternatively, the seat plate may be formed with an opening corresponding to the recess of the leaf spring and secured to the second surface of the leaf spring. In such a modification, the position pin is directly coupled with the recess of the leaf spring through the opening of the seat plate. It is preferable that in the leaf spring assembly, a tubular pad member of elastic material is coupled over the leaf spring and the seat plate. The pad member has a pair of first and second sheet portions respectively interposed between one of the retainer plates and the first surface of the leaf spring and between the other retainer plate and the seat plate, the second sheet portion of the tubular pad member being provided with a through hole in which the position pin is arranged.

BRIEF DESCRIPTION OF THE DRAWINGS

Additional objects and advantages of the present invention will be readily apparent from the following detailed description of certain preferred embodiments thereof when taken together with the accompanying drawings, in which.

DETAILED DESCRIPTION OF THE PREFERRED EMBODIMENTS

Figure 1:
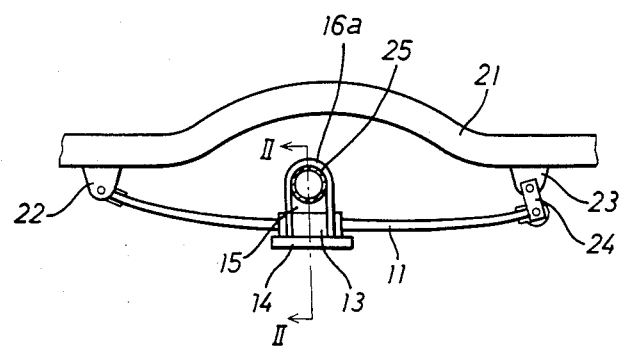
FIG. 1 illustrates an arrangement of a leaf spring assembly in accordance with the present invention.

Referring now to the drawings, particularly in FIG. 1, there is illustrated an arrangement of a leaf spring assembly in accordance with the present invention. The leaf spring assembly comprises a longitudinal leaf spring 11 made of fiber reinforced plastics connected at its front end to a front stationary bracket 22 and at its rear end to a shackle 24. The front stationary bracket 22 is welded to a side rail member 21 of a vehicle body structure, and the shackle 24 is pivoted to a rear stationary bracket 23 welded to the side rail member 21. In such arrangement, the longitudinal leaf spring 11 is mounted substantially at its central portion on a rear axle housing 25, as will described in detail hereinafter.

Figure 2:
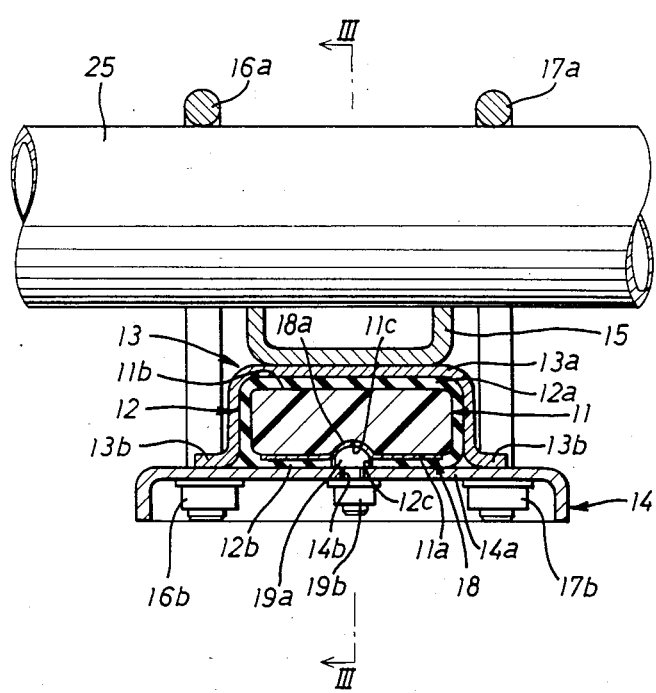
FIG. 2 is an enlarged sectional view taken along line II—II in FIG. 1.
Figure 3:
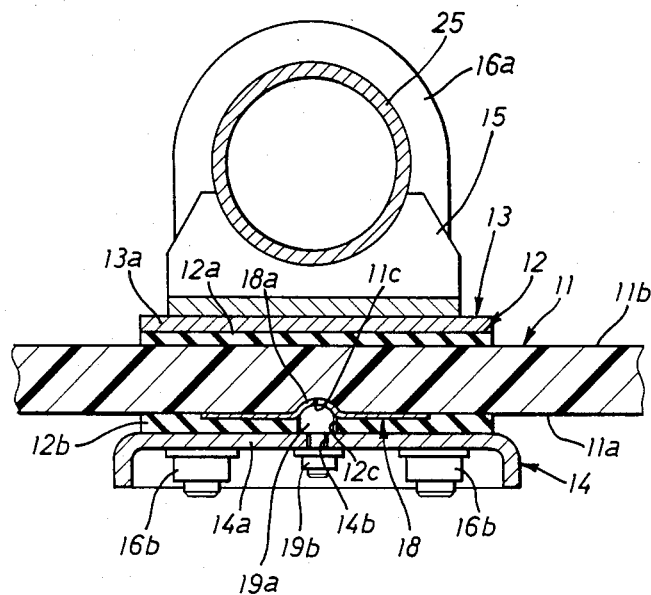
FIG. 3 is an enlarged sectional view taken along line III—III in FIG. 2.

As is illustrated in FIGS. 2 and 3, the longitudinal leaf spring 11 is surrounded substantially at its central portion by a tubular member 12 of elastic material the upper and lower sheet portions 12a and 12b of which are adapted as resilient pad members. The upper sheet portion 12a of tubular member 12 is covered by a metallic retainer plate 13 having a U-shaped cross-section, while the lower sheet portion 12b of tubular member 12 is received by a metallic retainer plate 14. The retainer plate 13 has a plate portion 13a above the upper sheet portion 12a of tubular member 12 and has a pair of flanges 13b extending downwardly from the opposite sides of plate portion 13a and in contact with the upper face of a plate portion 14a of lower retainer plate 14. Thus, the leaf spring 11 is interposed substantially at its central portion between the plate portions 13a and 14a of respective retainer plates 13 and 14 through the upper and lower sheet portions 12a and 12b of tubular member 12 and fixedly attached to the lower periphery of rear axle housing 25 through a bracket member 15 by means of a pair of fastening U-bolts 16a, 17a and nuts 16b, 17b fastened thereto.

In such a mounting construction as described above, the upper and lower sheet portions 12a, 12b of tubular member 12 are compressed by fastening of nuts 16b, 17b so that both the flanges 13b, 13b of retainer plate 13 are pressed in contact with the upper face of plate portion 14a of retainer plate 14 to firmly clamp the central portion of leaf spring 11 in place. As a result, a compression load acting on the leaf spring 11 is distributed to the upper and lower sheet portions 12a, 12b of tubular member 12 to enhance fatigue strength of leaf spring 11 in its vertical direction. In such a condition, the leaf spring 11 is applied at its upper surface with a tension force and at its bottom surface with a compression force.

As is illustrated in FIGS. 2 and 3, the central portion of leaf spring 11 is formed at its bottom surface 11a with a half spherical recess 11c, and a metallic seat plate 18 is adhered to the bottom surface 11a of leaf spring 11. The metallic seat plate 18 is formed substantially at its central portion with a protruded portion 18a which is coupled with the recess 11a in leaf spring 11. The size of seat plate 18 is determined to provide a sufficient adhesion area capable of resisting against a load acting thereon in a fore-and-aft direction. On the other hand, the lower retainer plate 14 is formed substantially at its central portion with a mounting hole 14b which is arranged at a position facing the protruded portion 18a of seat plate 18. A position pin 19a is in the form of a bolt inserted into the mounting hole 14b in retainer plate 14 and fastened in place by a nut 19b threaded thereto. Thus, the position pin 19a is coupled at its head within the protruded portion 18a of seat plate 18 through a through hole 12c in the lower sheet portion 12b of tubular member 12. When the nuts 16b, 17b have been fastened to the U-bolts 16a, 17a, the position pin 19a is snugly coupled at its head within the protruded portion 18a of seat plate 18.

During mounting process of the leaf spring assembly, when the leaf spring 11 is slightly displaced in the fore-and-aft direction after temporarily assembled to the rear axle housing by means of the above-described tubular member 12, retainer plates 13, 14, bracket member 15, U-bolts 16a, 17a, and nuts 16b, 17b, the head of position pin 19a is brought into engagement with the protruded portion 18a of seat plate 18 to position the leaf spring 11 in relation to the lower retainer plate 14. Subsequently, when the nuts 16b, 17b are completely fastenened to the U-bolts 16a, 17a, the leaf spring 11 is accurately positioned and retained in place owing to engagement of the position pin 19 with the protruded portion 18a of seat plate 18.

In the mounting construction of the leaf spring assembly, it is to be noted that the recess 11c is provided at the bottom surface of leaf spring 11 to maintain anti-fatigue strength of the leaf spring against loads acting thereto in the vertical direction. It is further noted that durability of the leaf spring assembly against loads acting thereto in the fore-and-aft direction is reliably ensured by engagement force among the position pin 19a, the protruded portion 18a of seat plate 18, and the recess 11a of leaf spring, adherence force between the leaf spring 11 and the seat plate 18, and friction force of the upper and lower sheet portions 12a, 12b of tubular member 12 against the leaf spring 11.

Figure 4:
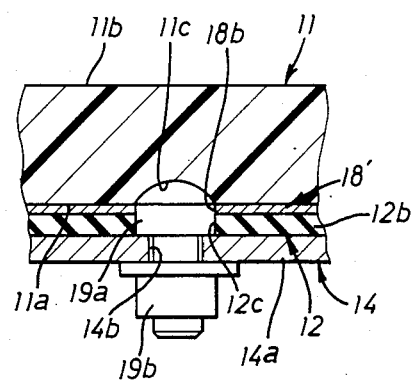
FIGS. 4 and 5 illustrate modifications of the leaf spring assembly shown in FIGS. 1 to 3.

In FIG. 4 there is illustrated a modification of the leaf spring assembly, in which the seat plate 18 is replaced with a metallic seat plate 18'. The metallic seat plate 18' is provided substantially at its central portion with an opening 18b which corresponds with the protruded portion 18a of the seat plate 18 and is arranged to face the recess 11c of leaf spring 11. In this modification, the position pin 19a is directly coupled within the recess 11c of leaf spring 11 through the through hole 12c in lower sheet portion 12b and the opening 18b in seat plate 18'.

Figure 5:
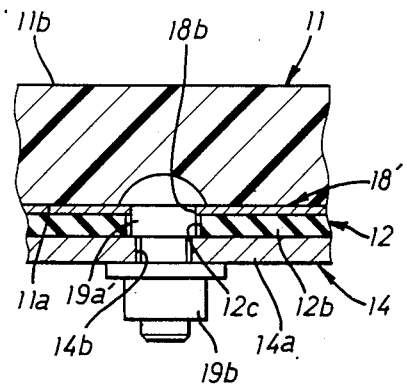
Figure 6:
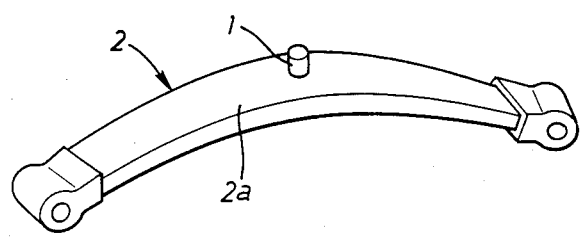
FIGS. 6 and 7 illustrate conventional leaf spring assemblies.
Figure 7:
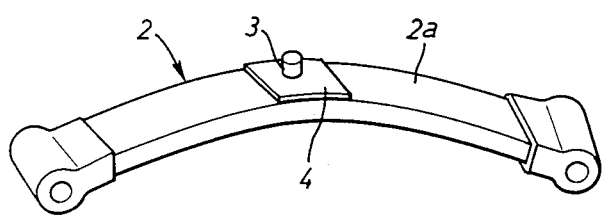

In FIG. 5 there is illustrated another modification of the leaf spring assembly, in which the position pin 19a is replaced with a position pin 19a' in the form of a stepped bolt. The stepped bolt 19a' is inserted into the opening 18b in seat plate 18' after directly coupled within the recess 11c of leaf spring 11, and the seat plate 18' is adhered to the bottom surface 11a of leaf spring 11. Thus, the stepped bolt 19a' is inserted into the mounting hole 14b in lower retainer plate 14 through the hole 12c in sheet portion 12b and fastened by nut 19b to position the leaf spring 11 in relation to the lower retainer plate 14. The other construction and parts are substantially the same as those in the embodiment shown in FIGS. 2 and 3.

In other modifications of the leaf spring assembly, the recess 11c of leaf spring 11 may be formed during or after molding process of the leaf spring 11 and may be formed in a cylindrical shape, a cone shape or the like in relation to the head shape of position pin 19a. Furthermore, the leaf spring 11 may be provided at its bottom surface with a plurality of recesses which are coupled with the corresponding position pins fastened to the lower retainer plate 14. Additionally, the metallic seat plate 18 may be replaced with a seat plate of synthetic resin, and the tubular member 12 may be replaced with a pair of pad members of elastic material.

Although certain specific embodiments and modifications of the invention have been shown and described, it is obvious that many variations thereof are possible. The invention, therefore, is not intended to be restricted to the exact showing of the drawings and description thereof, but is considered to include reasonable and obvious equivalents.

What is claimed is:

1. A leaf spring assembly comprising:
a longitudinal leaf spring made of fiber reinforced plastics having a length in the longitudinal direction, said leaf spring having a first surface to be applied with a tension force and a second surface to be applied with a compression force, said leaf spring being provided only on the second surface thereof with a recess which is located substantially at the central longitudinal portion of said leaf spring;
a pair of retainer plates attached to the first and second surfaces of said leaf spring;
means for clamping said retainer plates to said leaf spring and mounting the same on an axis housing;
a metallic seat plate formed with a protruded portion coupled with the recess of said leaf spring and secured to the second surface of said leaf spring; and
a position pin fixed to said retainer plate attached to the second surface of said leaf spring, said position pin being coupled with the recess of said leaf spring through the protruded portion of said seat plate to position said retainer plates substantially at the central longitudinal portion of said leaf spring, said position pin being in the form of a bolt having a head engaged with the protruded portion of said seat plate and being fastened to said retainer plate by a nut threaded thereto.

2. A leaf spring assembly comprising:
a longitudinal leaf spring made of fiber reinforced plastics having a length in the longitudinal direction, said leaf spring having a first surface to be applied with a tension force and a second surface to be applied with a compression force, said leaf spring being provided only on the second surface thereof with a recess which is located substantially at the central longitudinal portion of said leaf spring;

a pair of retainer plates attached to the first and second surfaces of said leaf spring;

means for clamping said retainer plates to said leaf spring and mounting the same on an axle housing;

a metallic seat plate formed with an opening corresponding to the recess of said leaf spring and secured to the second surface of said leaf spring; and a position pin fixed to said retainer plate attached to the second surface of said leaf spring, said position pin being directly coupled with the recess of said leaf spring through the opening of said seat plate to position said retainer plates substantially at the central longitudinal portion of said leaf spring, said position pin being a stepped bolt having a head and a stepped portion respectively engaged with said seat plate and with said retainer plate and being fastened to said retainer plate by a nut threaded thereto.

3. A leaf spring assembly according to claim 1, further comprising:

a tubular pad member of elastic material coupled over said leaf spring and said seat plate and having a pair of first and second sheet portions respectively interposed between one of said retainer plates and the first surface of said leaf spring and between the other retainer plate and said seat plate, the second sheet portion of said tubular pad member being provided with a through hole in which said position pin is arranged.

* * * * *